United States Patent
Cohen

(10) Patent No.: US 11,756,439 B2
(45) Date of Patent: Sep. 12, 2023

(54) METHOD AND SYSTEM FOR AVOIDING MID-AIR COLLISIONS AND TRAFFIC CONTROL

(71) Applicant: CICONIA LTD., Nes-Ziona (IL)

(72) Inventor: Moshe Cohen, Ra'anana (IL)

(73) Assignee: CICONIA LTD., Nes-Ziona (IL)

(*) Notice: Subject to any disclaimer, the term of this patent is extended or adjusted under 35 U.S.C. 154(b) by 401 days.

(21) Appl. No.: 16/968,691

(22) PCT Filed: Feb. 11, 2019

(86) PCT No.: PCT/IL2019/050164
§ 371 (c)(1),
(2) Date: Aug. 10, 2020

(87) PCT Pub. No.: WO2019/155475
PCT Pub. Date: Aug. 15, 2019

(65) Prior Publication Data
US 2020/0380878 A1    Dec. 3, 2020

(30) Foreign Application Priority Data

Feb. 11, 2018   (IL) .......................................... 257460

(51) Int. Cl.
*G08G 5/04* (2006.01)
*G05D 1/10* (2006.01)
(Continued)

(52) U.S. Cl.
CPC ............ *G08G 5/04* (2013.01); *B64C 39/024* (2013.01); *G05D 1/1064* (2019.05);
(Continued)

(58) Field of Classification Search
CPC ...... G08G 5/04; G08G 5/0008; G08G 5/0021; G08G 5/0069; G08G 5/0078;
(Continued)

(56) References Cited

U.S. PATENT DOCUMENTS

| | | | |
|---|---|---|---|
| 6,262,679 B1* | 7/2001 | Tran ....................... | G08G 5/045 342/36 |
| 2002/0011950 A1* | 1/2002 | Frazier ................... | G01C 23/00 342/30 |

(Continued)

FOREIGN PATENT DOCUMENTS

| WO | WO 2017/013650 | * | 1/2017 | ............... G08G 5/00 |
|---|---|---|---|---|
| WO | WO 2017013650 | | 1/2017 | |

OTHER PUBLICATIONS

International Search Report for PCT Application No. PCT/IL2019/050164 dated Mar. 19, 2019.

*Primary Examiner* — Joan T Goodbody
(74) *Attorney, Agent, or Firm* — PEARL COHEN ZEDEK LATZER BARATZ LLP

(57) ABSTRACT

A collision avoidance system (CAS) airborne unit onboard an aerial platform of a first priority level includes a navigational module to determine current position of the aerial platform; a communication module to intermittently transmit a localization transmission, and to receive intermittently transmitted localization transmissions from another CAS airborne unit on-board another lower priority level aerial platform; and a processor to calculate, based on the received intermittently transmitted localization transmissions and on a current location, speed and heading of the CAS airborne unit, a collision risk between the aerial platform and the other aerial platform, and to generate one or a plurality of steering commands and cause a transmission of one or a plurality of a steering commands to be performed by the other aerial platform and to cause the steering commands to be transmitted by the communication module to the other CAS airborne unit.

6 Claims, 8 Drawing Sheets

(51) Int. Cl.
 *B64C 39/02* (2023.01)
 *G08G 5/00* (2006.01)
 *B64U 10/13* (2023.01)

(52) U.S. Cl.
 CPC ......... *G08G 5/0008* (2013.01); *G08G 5/0021* (2013.01); *G08G 5/0069* (2013.01); *G08G 5/0078* (2013.01); *B64U 10/13* (2023.01); *B64U 2201/10* (2023.01)

(58) Field of Classification Search
 CPC ............... G05D 1/1064; B64C 39/024; B64C 2201/027; B64C 2201/141
 See application file for complete search history.

(56) References Cited

U.S. PATENT DOCUMENTS

| | | | |
|---|---|---|---|
| 2008/0160925 A1* | 7/2008 | Rofougaran | H04L 12/66 455/73 |
| 2009/0027253 A1 | 1/2009 | Van Tooren et al. | |
| 2016/0093124 A1* | 3/2016 | Shi | B64D 47/08 701/2 |
| 2017/0269594 A1 | 9/2017 | Syndor | |

* cited by examiner

METHOD AND SYSTEM FOR AVOIDING MID-AIR COLLISIONS AND TRAFFIC CONTROL

CROSS-REFERENCE TO RELATED APPLICATIONS

This application is a National Phase Application of PCT International Application No. PCT/IL2019/050164, International Filing Date Feb. 11, 2019, claiming priority of IL Patent Application No. 257460, filed Feb. 11, 2018, which is hereby incorporated by reference.

FIELD OF THE INVENTION

The present invention relates to mid-air collision avoidance and air traffic control. More specifically, the present invention relates to a method and system for avoiding mid-air collisions and traffic control.

BACKGROUND OF THE INVENTION

Mid-air collisions between aircrafts in flight are often fatal, resulting in loss of lives (typically of those onboard the aircrafts, but sometimes also resulting in loss of lives and casualties among people on the ground). Apart from loss of lives, mid-air collisions also impart heavy financial losses ranging from ruined aircrafts, lost payload and damages inflicted to buildings and other valuables on the ground.

Various systems and methods were developed to avoid mid-air collision or to substantially reduce the chances for such collision.

For example, U.S. Pat. No. 5,714,948 (Farmakis et al.) discloses a satellite based air traffic control (ATC) system that includes an aircraft unit on an aircraft and an ATC facility. The aircraft unit includes an ATC Aircraft Reporting and Tracking System (AARTS) processor, Global Positioning System (GPS) receivers or other satellite receivers, a comparator for comparing the GPS data, a two-way radio, and a transmitter and receiver for communicating information and data over a data link with the ATC facility. The system uses GPS on board the aircraft to enhance ATC data and improve the determination of aircraft locations. U.S. Pat. No. 5,872,526 (Tognazzini) also discloses a GPS collision avoidance system utilizing GPS for exact location of aircrafts.

U.S. Pat. No. 4,063,073 (Strayer) disclosed a method for preventing collision between moving objects such as aircraft moving from one sector to another. This patent refers, inter-alia, to a well-known method of considering cylinders as representations of the airborne aircraft in order to enhance the presence of a safety envelope around the aircraft (and see also U.S. Pat. No. 5,058,024).

U.S. Pat. No. 8,380,425 (Duggan et al., and see also U.S. Pat. No. 8,700,306) disclosed an autonomous collision avoidance systems for unmanned aerial vehicles. Systems illustratively include a detect and track module, an inertial navigation system, and an auto avoidance module. The detect and track module senses a potential object of collision and generates a moving object track for the potential object of collision. The inertial navigation system provides information indicative of a location and a speed of the unmanned aerial vehicle. The auto avoidance module receives the moving object track for the potential object of collision and the information indicative of the location and the speed of the unmanned aerial vehicle. The auto avoidance module utilizes the information to generate a guidance maneuver that facilitates the unmanned aerial vehicle avoiding the potential object of collision.

U.S. Pat. No. 8,892,348 (Chamlou) disclosed methods, systems, and computer program products for aircraft conflict detection and resolution. Embodiments of the invention detect potential conflicts without a predetermined look-ahead time threshold and determine the time for issuing resolution alerts dynamically based on the relative movements of the aircraft. A method embodiment for detecting a potential airborne conflict between an ownship and at least one intruder includes, determining a relative motion trajectory of the ownship and the intruder, generating a plurality of resolution advisories based upon the determined relative motion trajectory and corresponding to respective motion dimensions of the ownship, determining an alert time for each of the plurality of RAs responsive to the corresponding motion dimension and the determined relative motion trajectory, and transmitting at least one of the plurality of RAs to at least one of the ownship or an aircraft control entity.

U.S. Patent Application publication No. 2018/0211549 (Cohen) disclosed a system and method for autonomous dynamic air traffic management. The method includes sensing a current location of a flying platform using at least one of a plurality of positioning sensors onboard the flying platform, transmitting location transmissions and receiving location transmissions from other flying platforms, determining from the received location transmissions and the sensed current location whether the flying platform and another flying platform are flying in a mutually intentional flight pattern or in a mutually unintentional flight pattern, based on one or more indications. The method also includes refraining from alerting when the flying platform and the other flying platform fly close to each other within a predetermined range when flying in a mutually intentional flight pattern; detecting a risk of collision between the flying platform and said another of said one or a plurality of flying platthrms; and generating an evading action instruction for the flying platform to avoid the collision.

SUMMARY OF THE INVENTION

There is provided, according to some embodiments of the present invention, a collision avoidance system (CAS) airborne unit for placing onboard an aerial platform classified as having a first priority level. The CAS airborne unit may include a navigational module comprising one or a plurality of navigational or positioning sensors, to determine at least current position of the aerial platform. The CAS airborne unit may also include a communication module to intermittently transmit a localization transmission that includes at least a current location of the aerial platform, and to receive intermittently transmitted localization transmissions from another CAS airborne unit on-board another aerial platform that is classified as having a second priority level that is lower than the first priority level. The CAS airborne unit may also include a processor to calculate, based on the received intermittently transmitted localization transmissions and on a current location, speed and heading of the CAS airborne unit, a collision risk between the aerial platform and the other aerial platform, and to generate one or a plurality of steering commands and cause a transmission of one or a plurality of a steering commands to be performed by the other aerial platform, designed to reduce the collision risk and to cause the steering commands to be transmitted by the communication module to the other CAS airborne unit.

In some embodiments of the invention, the processor is configured to transmit one or a plurality of transmission requests to invoke the intermittently transmitted localization transmissions from the other CAS airborne unit.

In some embodiments of the invention, the processor is configured to dictate a transmission frequency for said one or a plurality of transmission requests.

In some embodiments of the invention, the processor is configured to adjust a frequency of the intermittently transmitted localization transmission from the communication module.

In some embodiments of the invention, said one or a plurality of navigational or positioning sensors is selected from the group consisting of barometric altimeter, GPS, INS and IMU sensors.

In some embodiments of the invention, wherein the processor is configured to transmit a frequency command to the other CAS airborne unit to control frequency of the intermittently transmitted localization transmission of that CAS airborne unit.

In some embodiments of the invention, wherein the navigational module is configured to detect speed and heading of the aerial platform.

In some embodiments of the invention, the communication module is further configured to receive another response to that transmission request from another CAS airborne unit onboard another aerial platform that is classified as having the same first priority level, wherein the response includes information on a current location of the other CAS airborne unit; and wherein the processor is configured, based on the information of the other response and on a current location, altitude, speed and heading of the CAS airborne unit, to calculate a collision risk or a traffic conflict between the aerial platform and the other aerial platform having the same priority level, and to generate one or a plurality of steering commands to be performed by the aerial platform.

In some embodiments of the invention, the CAS airborne unit further includes a display for displaying one or a plurality of messages relating to said one or a plurality of steering commands.

In some embodiments of the invention, the CAS airborne unit further includes an audio device for audibly providing one or a plurality of messages relating to said one or a plurality of steering commands.

In some embodiments of the invention, there is provided a collision avoidance system (CAS) airborne unit for placing onboard an aerial platform classified as having a first priority level. The CAS airborne unit may include a navigational module comprising one or a plurality of navigational or positional sensors, to determine current location of an aerial platform The CAS airborne unit may also include a communication module to intermittently transmit a localization transmission that includes at least a current location of the aerial platform to another CAS airborne unit onboard another aerial platform that is classified as having a second priority level that is higher than the first priority level, and to receive from the other CAS airborne unit a transmission of one or a plurality of a steering commands to be performed on the aerial platform; and a processor to cause said one or a plurality of steering commands to be performed by the aerial platform, or to cause said one or a plurality of steering commands to be presented to a pilot of the aerial platform.

In some embodiments of the invention, the CAS airborne unit further includes a display for displaying one or a plurality of messages relating to said one or a plurality of steering commands.

In some embodiments of the invention, the CAS airborne unit is further configured to cooperate with a CAS ground unit.

In some embodiments of the invention, the CAS ground unit and the CAS airborne unit are separably integrated on a single board.

In some embodiments of the invention, the CAS ground unit is configured to receive a steering transmission including said one or a plurality of a steering commands and configured to present said one or a plurality of a steering commands to a user.

In some embodiments of the invention, the CAS ground unit includes a display for displaying messages relating to said one or a plurality of steering commands to the user, or includes an audio device for playing audible messages relating to said one or a plurality of steering commands to the user.

In some embodiments of the invention, the CAS airborne unit is physically but not electrically or electronically coupled the aerial platform.

In some embodiments of the invention, there is provided an air collision avoidance method that includes intermittently transmitting, by each of a first airborne unit onboard a first aerial platform classified as having a first priority level and a second airborne unit onboard a first aerial platform classified as having a second priority level that is lower than the first priority level, a localilzation transmission that includes at least a current location of that aerial platform; receiving, by the first airborne unit the intermittently transmitted localization transmissions from the second airborne unit; based on the received intermittently transmitted localization transmissions from the second airborne unit and on a current location, speed and heading of the first airborne unit, calculating a collision risk between the first aerial platform and the second aerial platform; and generating, by the first airborne unit, one or a plurality of steering commands to be performed by the second aerial platform and transmitting said one or a plurality of steering commands to the second airborne unit.

In some embodiments of the invention, there is provided a decentralized density control (DDC) airborne unit for placing onboard an aerial platform. The DDC airborne unit may include a navigational module comprising one or a plurality of navigational or positioning sensors, to determine at least current location of the aerial platform; a communication module to intermittently transmit a localization transmission that includes current location of the aerial platform, and to receive intermittently transmitted localization transmissions including current location of other DDC airborne units, each on-board of other aerial platforms; and a processor to calculate, based on the received intermittently transmitted localization transmissions on a current location, speed and heading of the DDC airborne unit, compliance to at least one air traffic rule within a predefined personal airspace of the aerial platform, and to generate one or a plurality of steering commands and cause a transmission of one or a plurality of a steering commands to be performed by the aerial platform or by any of the other aerial platforms, to comply with said at least one air traffic rules.

BRIEF DESCRIPTION OF THE DRAWINGS

In order to better understand the present invention and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

Figure 1:
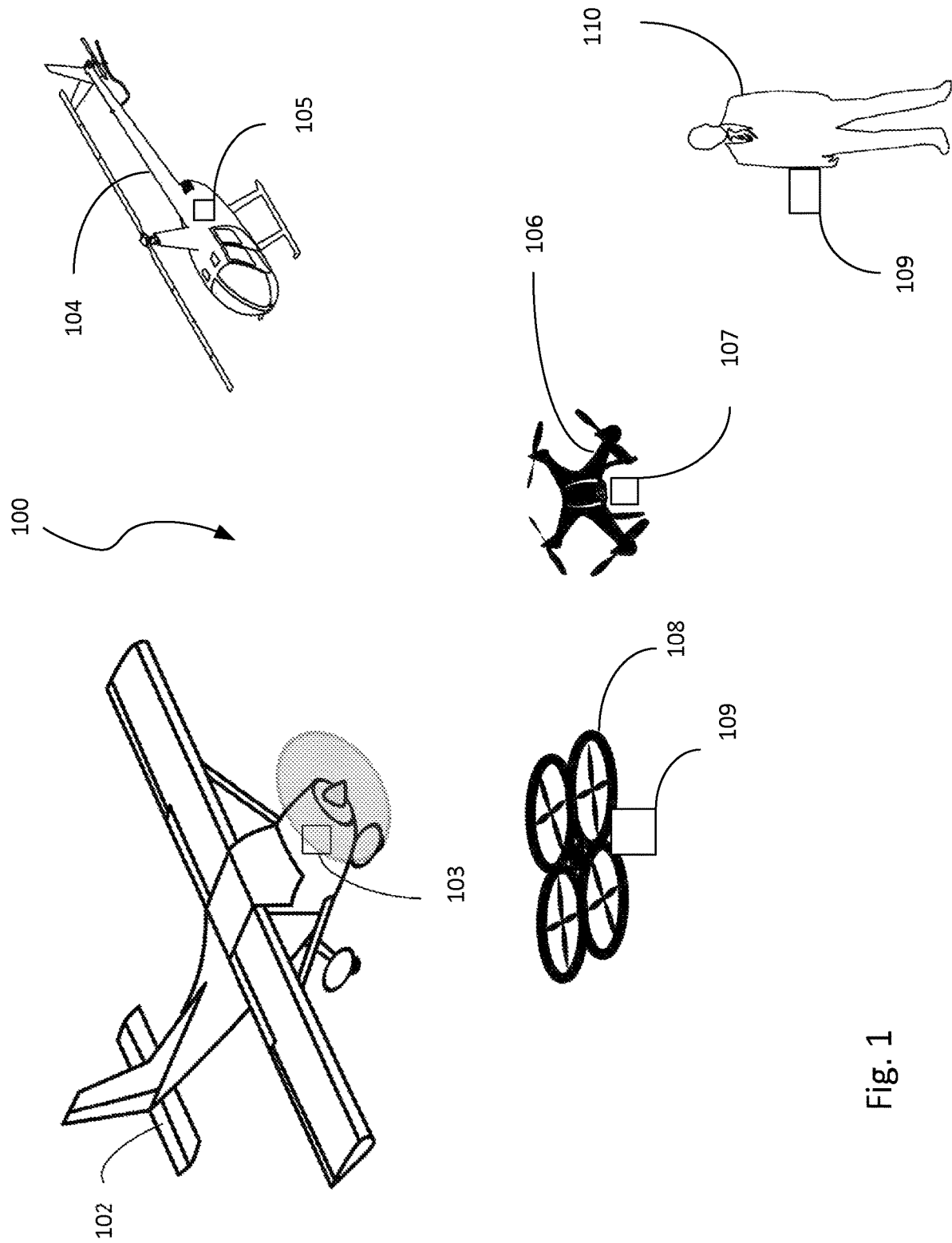
FIG. 1 schematically illustrates an airspace in which a plurality of aerial platforms of various priority levels concurrently exist, each including an on-board CAS airborne unit, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating," "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The world's deadliest mid-air collision happened in 1996 when Saudia flight 763 and Air Kazakhstan flight 1907 collided over the village of Charkhi Dadri in India, killing all 349 passengers and crew on board both aircraft. Other mid-air collisions over the years took the lives of many passengers and crew members. A mid-air collision is an aviation accident involving two or more aircraft that come into contact during flight. In the context of the present invention the definition of "mid-air collision" is extended to also include an accident in which an aircraft (one or more) collides with a toll building or other man-made structure or natural earth structure (for example: cliffs, ground). While a mid-air collision may occur during takeoff, ascending at cruise altitude or when descending towards landing, the risk of mid-air collision is evidently greater near air-fields or in narrow air-corridors in which aircraft traffic is relatively dense. The advance in unmanned aircraft (unmanned aerial vehicles—UAV) has brought about increased risk of collisions between two UAVs of between a manned aircraft and UAV.

Typically, when cruising, aircraft fly far from each other. Typically, the distance between cruising aircraft that fly by is usually more than one kilometer, and in many cases much more.

Before the introduction of unmanned aerial vehicles the vast majority of aerial platforms occupying the skies where piloted by pilots onboard, typically seated at the front edge of the platform looking forward to the zone the platform is flying to. Pilots are typically expected to be responsible for following flight rules and regulations and for constantly monitoring the skies ahead to make sure no other platform endangers their own platform.

The introduction of unmanned aerial vehicles (UAV) has brought about new challenges, some of which include: no pilot onboard most of the UAVs; fully autonomous UAVs conducting autonomous missions: no remote pilot to control the platform; a large number of small-size UAVs, making these practically invisible to human pilots; the numbers of UAVs in urban skies expected to rise steeply; sophisticated UAVs (drones and other modern unmanned aerial systems) may be operated by inexperienced non-sophisticated pilots.

According to some embodiments of the present invention a method and system are provided aimed at avoiding mid-air collision providing traffic control. According to some embodiments of the invention, such method and system may facilitate priority management (e.g. giving priority to prioritized missions and prioritized platforms to use the air space); may provide for light weight, low cost equipment for use by low-cost, small platforms; may facilitate avoidance of traffic conflicts and mid-air collisions in scenarios involving autonomous UAVs and/or inexperienced pilots.

According to some embodiments of the present invention, a method and system for avoiding mid-air collision and traffic control may employ automatic risk level control, e.g., via autonomous decentralized density control and/or via conflict avoidance mechanism.

According to some embodiments of the present invention, a system for avoiding mid-air collision (hereinafter—collision avoidance system—CAS) is designed to relate to flight platforms classified into at least two priority levels: a first priority level (hereinafter, for brevity: "first level") and a second priority level (hereinafter, for brevity: "second level"). In some embodiments of the invention more than two priority levels may be considered.

A method and system for avoiding mid-air collision and traffic control, according to some embodiments of the present invention, is designed to prevent and resolve conflicts between aerial platforms of the same priority level (e.g., two level 1 platforms and/or two level 2 platforms), and between aerial platforms of different priority levels (e.g., level 1 platform and level 2 platform).

Level 1 aerial platforms may include, for example, manned aircraft, higher priority aerial platforms. Examples of Level 1 aerial platforms: a) manned platform, pilot onboard, pilot constantly monitors future flight path; b) manned platform, pilot onboard pilot may and may not monitor future flight path; c) no manned pilot onboard, but with a remote pilot or autonomous auto-pilot, that may carry passengers onboard, etc.

Level 2 aerial platforms may include, for example, lower priority aerial platforms, light platforms, unmanned, remote pilot or autonomous autopilot, lighter, inexpensive platforms, never carries human passengers, no human pilot onboard.

"Heavy" or "light" may be predetermined (e.g., defined by regulatory authorities). In some examples, "heavy platform" may relate to aerial platforms that are heavier than a certain predetermined weight (e.g., 10 kg), whereas "light platform" may relate to aerial platforms that are lighter than that predetermined weight.

According to some embodiments of the present invention, a CAS airborne unit on-board a priority level 1 aerial platform is configured to intermittently send transaction requests, which may be picked up by other CAS airborne units within a receiving space and receive a response from each of these CAS airborne units. In some embodiments of the invention, each CAS airborne unit that picks up the transaction request sends (e.g., periodically) a response that includes identity of that CAS airborne unit (or the corresponding aerial platform on which that CAS airborne unit is positioned on) and location of that CAS airborne unit (aerial platform).

According to some embodiments of the present invention, if the responding CAS airborne unit is related to (on board) an aerial platform having a priority level that is lower than the priority level of the aerial platform transmitting the transmission request, the CAS airborne unit of the higher priority calculates a collision risk or compliance with traffic control rules, based on the transmitted data and own data and generates steering commands, if needed, to avoid collision or to obey the traffic control rules, and forwards the steering commands to the CAS airborne unit on the aerial platform of the lower priority to be executed automatically (e.g., by the CAS airborne operating the flight controls of the aerial platform) or by a pilot that controls the flight of that aerial platform.

In some embodiments the CAS airborne unit does not necessarily transmit any transmission request, and each CAS airborne unit (of all priority levels) intermittently transmits a localization transmission that includes at least a current location of the aerial platform.

In some embodiments, if the CAS airborne nit of the aerial platform of the higher priority level determines that the maneuver of the other aerial platform is not enough to avoid the collision risk, that CAS airborne unit may calculate an evasive maneuver and generate steering commands to own aerial platform (to be performed by the pilot on board or automatically by an automatic pilot).

In case of such communication being performed by two CAS airborne units on aerial platforms of the same priority level, each CAS airborne unit calculates the collision risk or compliance with traffic control rules and generates steering commands to be performed by own aerial platform.

If a CAS airborne unit of a lower priority level receives steering communications from more than one other CAS airborne unit of a higher priority level, the CAS airborne unit of that aerial platform, upon identifying receipt of different steering commands may generate a compromised solution, for example generate steering commands for own aerial platform to take a flight course that is between two different courses dictated by the different higher priority level CAS airborne units. If the different steering commands received from more than one other CAS airborne unit of a higher priority level include conflicting steering commands, the CAS airborne unit of that aerial platform, upon identifying receipt of conflicting steering commands may generate a freeze command to hold the aerial platform in position.

In some embodiments, the CAS airborne unit may communicate with other collision avoidance of air traffic control airborne systems which cannot cooperate with a CAS airborne unit according to the present invention, and obtain position information of other aircraft so as to generate, if necessary, steering commands to avoid collision with such aircraft.

In some embodiments, the CAS airborne unit of an aerial platform of lower priority level or same priority level of another aerial platform may communicate own steering commands to other CAS airborne units.

In some embodiments, if CAS airborne unit of a remotely controlled drone of lower priority level or same priority level of another aerial platform may communicate an alert about receipt of a transmission request, so that the remote pilot may consider landing of the drone to avoid traffic problems.

FIG. 1 schematically illustrates an airspace 100 in which a plurality of aerial platforms of various priority levels concurrently exist, each including an on-board CAS airborne unit, according to some embodiments of the present invention.

An airspace may be occupied by one or more priority level 1 aerial platforms, such as, for example aircraft 102, e.g., a light plane and aircraft 104, e.g., a helicopter, and/or one or a plurality of priority level 2 aerial platforms, such as, for example, remotely-controlled drone 106 (controlled from the ground by a remote pilot 110) and autonomous drone 108. Light plane 102, helicopter 104, remotely-controlled drone 106 and autonomous drone 108 have, each, on-board, a CAS airborne unit. aircraft 102 and aircraft 104 may each be equipped with a CAS airborne unit (103 and 105 respectively) designed or configured for priority level 1 aerial platform (having the pilot on-board). Drones 106 may each be equipped with a CAS airborne unit 107 designed or configured for priority level 2 aerial platform controlled by a remote pilot 110 equipped with a CAS ground unit 109, whereas drone 108 may be equipped with a CAS airborne unit 107 designed or configured for priority level 2 autonomous aerial platform.

Figure 2:
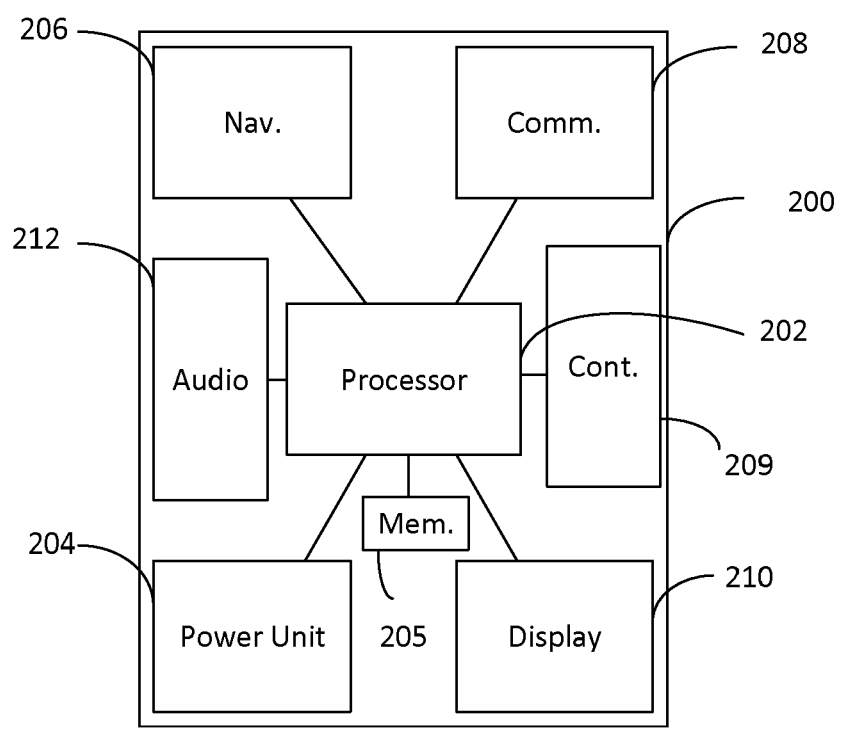
FIG. 2 is a block diagram of a CAS airborne unit, according to some embodiments of the present invention.

FIG. 2 is a block diagram of a CAS airborne unit 200, according to some embodiments of the present invention.

In some embodiments of the present invention various configurations of CAS airborne units may be provided, for example, a CAS airborne unit for an aerial platform with a pilot on board, a CAS airborne unit for an aerial platform with a remote pilot, a CAS airborne unit for an autonomous flight aerial platform, a CAS airborne unit for a high priority level aerial platform, a CAS airborne unit for a low priority level aerial platform.

In some embodiments of the present invention, a general purpose CAS airborne unit may be provided, allowing various configurations to be selected (e.g., toggle between priority level 1 or 2, toggle between on-board pilot or remote pilot, etc.).

Generally, a CAS airborne unit 200 may include a processor 202, memory 205, a power unit 204 (e.g., battery, a rechargeable battery, a transformer connectable to a power supply, etc.) for powering the unit, a navigational module 206 (having one or a plurality of positioning and/or navigational sensors, e.g., barometric altimeter, global positioning system—GPS, inertial navigational system—INS, inertial measurement unit—IMU, etc.) for determining at least that aerial platform current location, and, in some embodiments also speed and heading, a communication module (e.g., a radio frequency—RF transceiver) for communicating with other CAS airborne units, for example as described hereinafter.

In some embodiments, a controller 209 may be provided to control (e.g., override) the flight controls of the aerial platform on which is it mounted to perform steering commands, (for example, override the flight plan or a remote pilot of the aerial platform on which is it mounted in certain circumstances, e.g., if the pilot fails to perform steering commands instructed by the CAS to avoid collision), a display 210, for displaying messages (e.g., steering commands), data and other visual information to the pilot, an audio unit 212 (e.g., a loudspeaker, or a port for connecting headphones) for providing audio messages (e.g., steering commands, audio alerts, and other audio messages).

In some embodiments of the present invention the CAS airborne unit may be a stand-alone device, that is not electronically or electrically linked to the aerial platforms, and specifically not linked to the flight controls of that aerial platform. In such cases the CAS airborne unit is merely physically carried by the aerial platform. In such embodiments, there may be no controller for linking to the controls of the aerial platform. The CAS airborne unit in such cases may only be designed to communicate with other CAS airborne units and to provide steering commands (that were generated by that CAS airborne unit or by another) to the pilot of that aerial platform—be it an on-board pilot or a remote pilot (via a CAS ground unit with which that CAS airborne unit is designed to communicate).

Figure 3A:
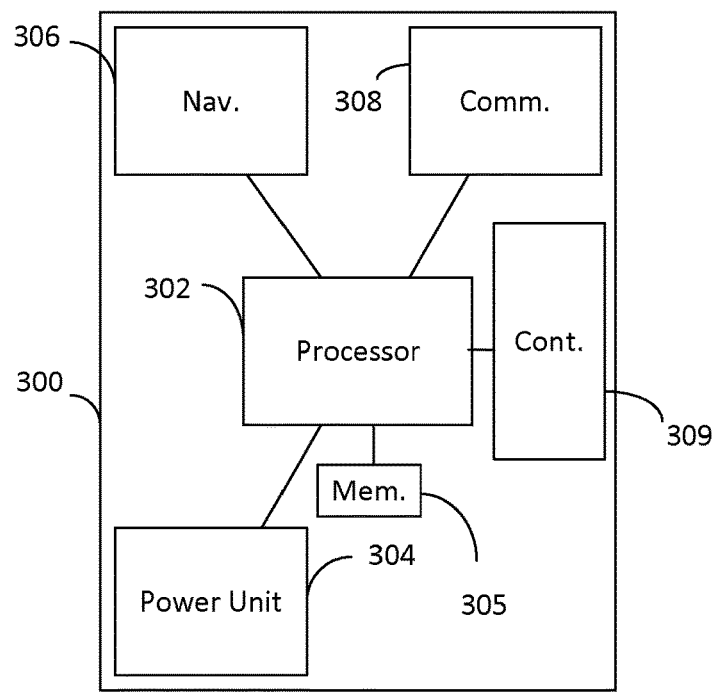
FIG. 3A is a block diagram of a CAS airborne unit, according to some embodiments of the present invention, designed, for example, for an autonomous or a remotely-controlled aerial platform.

FIG. 3A is a block diagram of a CAS airborne unit 300, according to some embodiments of the present invention, designed for an autonomous or a remotely-controlled aerial platform.

CAS airborne unit 300 may include a processor 302, memory 305, a power unit 304, (e.g., battery, a rechargeable battery, a transformer connectable to a power supply, etc.) for powering the unit, a navigational module 306 (having one or a plurality of positioning and or navigational sensors, e.g., barometric altimeter, GPS, inertial navigational sensor, IMU, etc.) for determining at least the location of that aerial platform, and in some embodiments also speed and heading of that aerial platform, a communication module 308 (e.g., a radio frequency—RF transceiver), and a controller 309 to control the flight controls of the aerial platform on which is it mounted. In the absence of an on-board pilot a display and/or audio device may not be needed.

According to some embodiments of the invention, some or all of the CAS airborne components (e.g., processor, navigation unit, power unit, communication module, display, audio device and memory) may be dedicated components or available resources on-board the aerial platform.

Figure 3B:
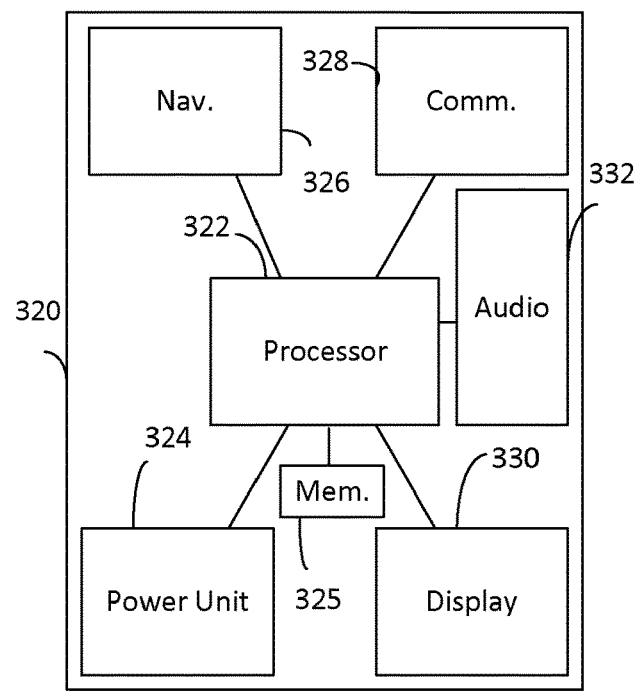
FIG. 3B is a block diagram of a CAS ground unit, according to some embodiments of the present invention, designed for use by a remote pilot, controlling a remotely-controlled aerial platform.

FIG. 3B is a block diagram of a CAS ground unit 320, according to some embodiments of the present invention, designed for use by a remote pilot, controlling a priority level 1 remotely controlled aerial platform (with human passenger or passengers) or controlling priority level 2 remotely-controlled aerial platform, which is equipped with a CAS airborne unit (e.g., CAS airborne unit 300). CAS ground unit 320 may include a processor 322, memory 325, a power unit 324 (e.g., battery, a rechargeable battery, a transformer connectable to a power supply, etc.) for powering the unit, a navigational module 326 (having one or a plurality of positioning and or navigational sensors, e.g., barometric altimeter, GPS inertial navigational sensor, IMU, etc.), a communication module 328 (e.g., a radio frequency—RF transceiver), and a display 330, for displaying messages, data and other visual information to the pilot. An audio unit 332 (e.g., a loudspeaker, or a port for connecting headphones) may also be provided, for sounding audio commands, audio alerts, and other audio messages to the remote pilot. A CAS ground unit, according to some embodiments of the invention may be integrated with a remote control used by the remote pilot, or may be separate from the remote control. In some embodiments, the CAS ground unit may be in the form of a hand-held, or a wearable device (e.g., like a smartwatch). Other configurations may also be considered.

Figure 3C:
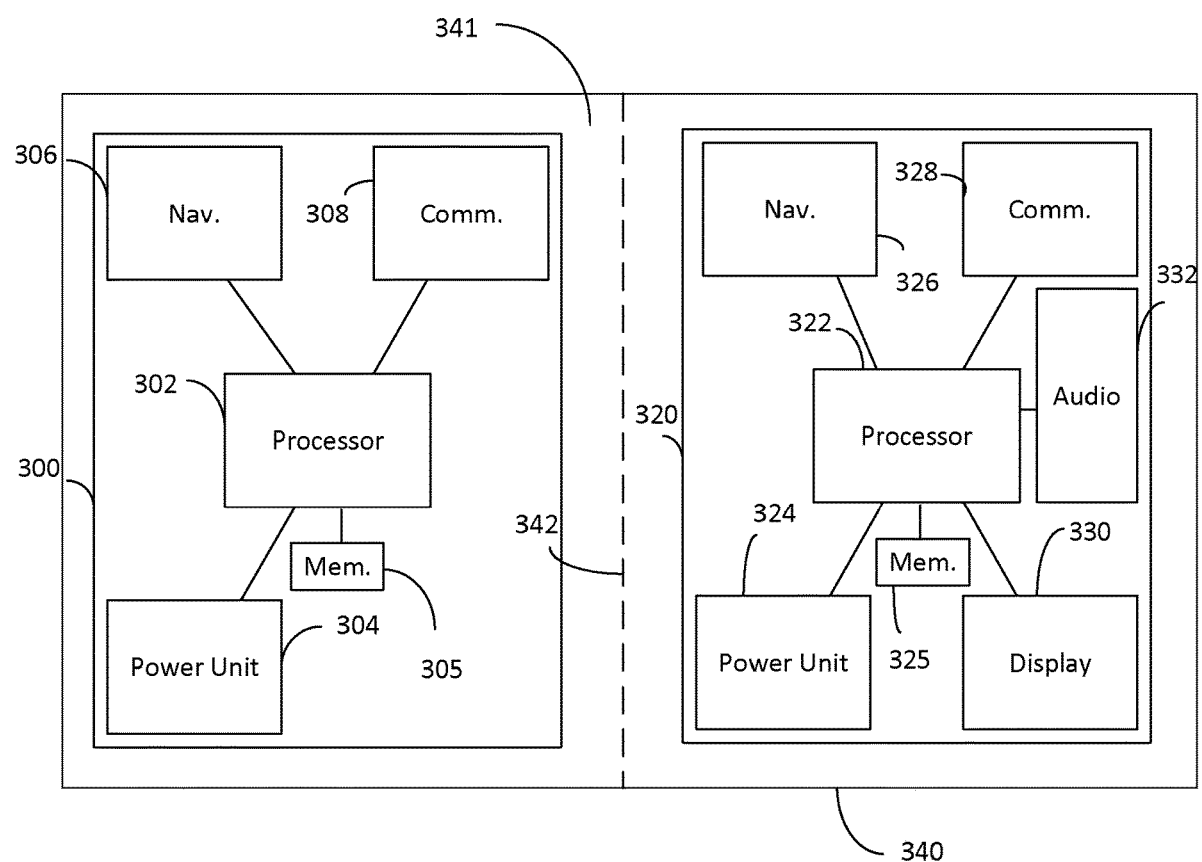
FIG. 3C is a block diagram of a CAS kit 340 that includes a CAS airborne unit and a CAS ground unit, according to some embodiments of the present invention.

FIG. 3C is a block diagram of a stand-alone CAS kit 340 designed for priority level 1 remotely-controlled (by a remote human pilot) or for priority level 2 autonomous or remotely-controlled aerial platform, with detachable CAS airborne unit and CAS ground unit, according to some embodiments of the present invention. In this embodiment, the CAS airborne unit and the CAS ground unit operate separately from the flight controls of the aerial platform and the remote control of the remote pilot.

According to some embodiments of the present invention CAS kit 340 may be formed on a single carrier 341, e.g., printed circuit board (PCB), with a perforation line 342 separating between CAS airborne unit 300 and CAS ground unit 320. The two units may be separated by tearing the perforation line to disengage the CAS airborne unit 300 from the CAS ground unit 320. Such configuration may be advantageous for use for priority level 2 autonomous or remotely-controlled aerial platforms, e.g. UAVs. UAVs, and especially UAVs for civilian use are typically light platforms (less than 10 kg), and are considerably smaller (typically by one and in many cases several orders of magnitude) than priority level 1 aerial platforms.

A CAS kit (e.g., kit 340) may be provided on a single board, for use with a priority level 1 or priority level 2 unmanned aerial platforms. In some embodiments, If that unmanned aerial platform is an autonomous drone, the CAS ground unit 320 may not be activated.

In the case of an unmanned aerial platform that is controlled by a remote pilot, CAS ground unit 320 may be detached from CAS airborne unit 300. CAS ground unit 320 may remain with the remote pilot, while CAS airborne unit 300 may be mounted on the unmanned aerial platform.

Figure 4:
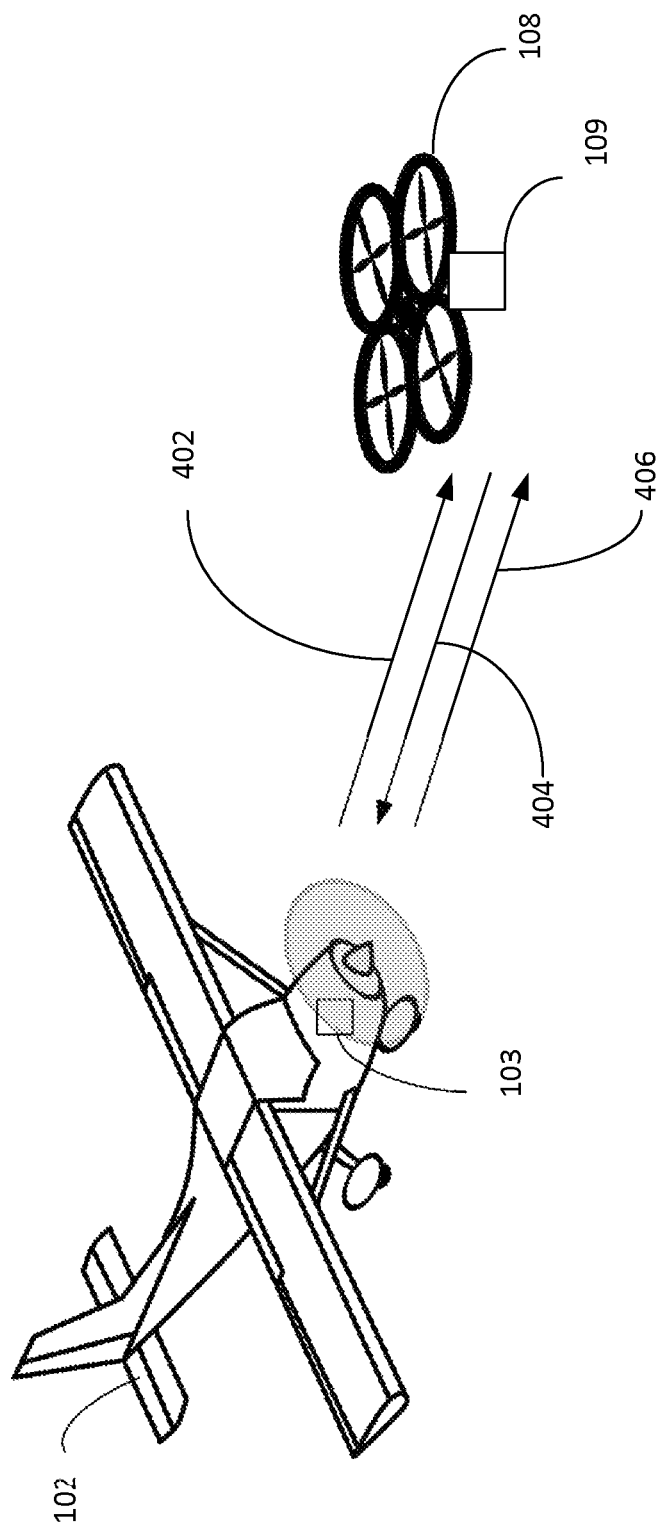
FIG. 4 illustrates operation of CAS airborne units on board two aerial platforms of different priority level, the lower priority level platform being an autonomous aerial platform, according to some embodiments of the invention.

FIG. 4 illustrates operation of CAS airborne units on board two aerial platforms of different priority level, according to some embodiments of the invention. Light plane 102, may be classified as a priority level 1 aerial platform, while autonomous drone 108 may be classified as a priority level 2 aerial platform.

CAS airborne unit 103 onboard the light plane 102, which is a priority level 1 aerial platform, may periodically transmit, at a predetermined rate, a "wake-up call", which is a transmission request 402. CAS airborne unit 109, onboard the autonomous drone 108, which is a priority level 2 aerial platform, when located within a receiving distance to receive the transmission request, issues a response transmission 404 to the transmission request that includes its own identification information, and its current flight information, e.g., its location (e.g., coordinates, altitude), speed and heading. In some embodiments the flight information may include only location information. Altitude may be obtained, for example form, barometric altimeter, coordinates and heading form a GPS or other positioning system, speed form GPS, IMU, magnetic compass, etc. Upon receipt of the response transmission from CAS airborne unit 109, CAS airborne unit 103 may calculate the risk of collision based on the response information and/or refer to a set of rules for governing an interaction between two aerial platforms (in this case of different priority levels) and if needed, transmit back a steering command/s signal with steering command or commands to CAS airborne unit 109 to follow (by steering the aerial platform—the autonomous drone 108, using the controller).

According to some embodiments of the invention, it is the CAS airborne unit of the higher priority level that issues steering commands to the lower priority level CAS airborne unit, and not vice versa.

Steering commands may include, for example, hover in your position (freeze), go to point (of specific position or a relative position with respect to the CAS receiving the steering commands), descend/ascend a determined delta altitude, move a determined distance to north/south/east/west, return home (RH). In some embodiments of the present invention, the steering commands are pre-set steering commands.

In some embodiments of the invention the CAS airborne units may be designed to allow a user to select an operation mode from several operation modes, for example, collision avoidance mode or conflict resolution.

When collision avoidance mode is selected the CAS airborne unit may be designed to generate steering commands aimed at preventing the two aerial platforms from entering into a traffic conflict.

When conflict resolution mode is selected the CAS airborne unit may be designed to generate steering commands aimed at resolving traffic conflicts IE escaping a mid-air collision.

The steering commands may be enforced on the autopilot of the aerial platform,

A basic operation of a CAS airborne unit of a priority level 2 aerial platform may include some or all of the following steps:

a) before takeoff: in the case of a CAS kit, an operator detaches the CAS airborne unit from the CAS ground unit, connects the CAS airborne unit to the aerial platform, with CAS airborne unit entering into listening mode—in some embodiments the CAS airborne unit may be connected only physically to the aerial platform (e.g., using a strap, hook-and-loop (e.g., Velcro) or other physical engagement), in some embodiments the CAS airborne unit may be also linked electrically or electronically (e.g., via a USB connectors or other electrical or electronical connector, so as to get its power and/or share electrical components of the aerial platform, operate flight controls etc.);

b) after takeoff, the CAS airborne unit may store location of the takeoff position as "home";

c) after receiving a transmission request the CAS airborne unit transmits a response transmission with its own identity information and its current flight information that may include its 'home' position; The response transmission may be transmitted periodically, at a predetermined rate or at a rate dictated by the CAS that issued the transmission request;

d) after receiving steering commands from the CAS airborne unit of the other aerial platform (with higher priority level), applying the steering commands on the flight controls of own aerial platform.

Figure 5:
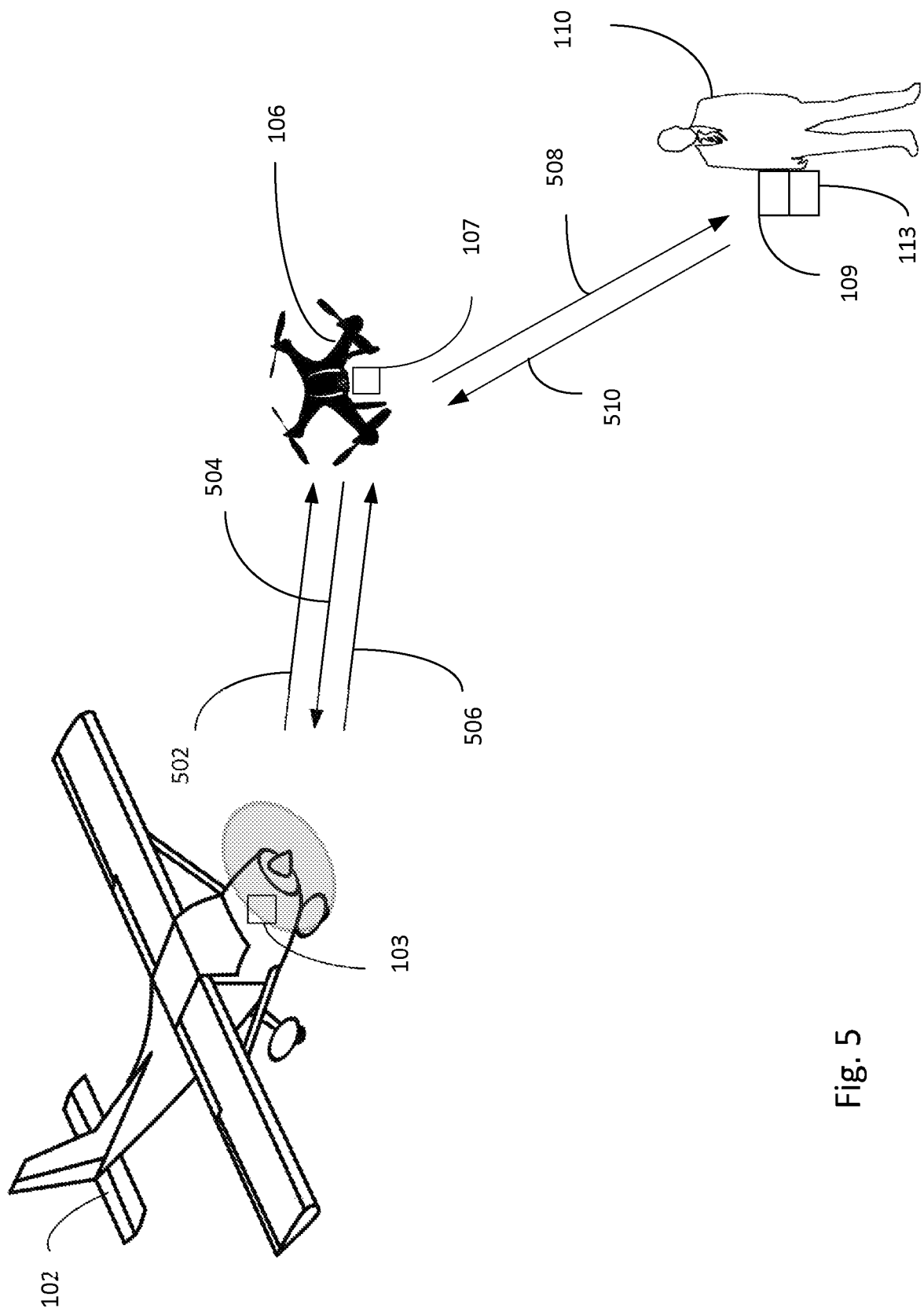
FIG. 5 illustrates operation of CAS airborne units on board two aerial platforms of different priority level, the lower priority level platform being remotely controlled, according to some embodiments of the invention.

FIG. 5 illustrates operation of CAS airborne units on board two aerial platforms of different priority level, according to some embodiments of the invention. Light plane 102, may be classified as a priority level 1 aerial platform, while remotely controlled drone 106 may be classified as a priority level 2 aerial platform. A human operator—a remote pilot 110 may use a remote control 113, which is designed to control the flight of drone 106. CAS ground unit 109 may be connected (physically and/or electrically or electronically) to remote control 113 or just provided within a reach and/or view of the remote pilot.

A basic operation of a CAS airborne unit of a priority level 2 aerial platform—drone 109—may include some or all of the following steps:

a) before takeoff: in the case of a CAS kit, an operator detaches the CAS airborne unit from the CAS ground unit, connects the CAS airborne unit to the aerial platform, and connects the CAS ground unit to the remote control of the remote pilot; when disconnected, both CAS units of the kit may enter listening mode;

b) after takeoff, the CAS airborne unit may store location of the takeoff position as "home"; if the remote pilot moves away from the initial position more than a predetermined distance (e.g., more than 50 meters), the new location of the remote pilot is transmitted to the CAS airborne unit 107 and stored as a new "home" position;

c) after receiving a transmission request 502 from the CAS airborne unit 103 of the priority level 1 platform (light plane 102) the CAS airborne unit transmits a response transmission 504 with its own identity information and its current flight information, that may include 'home' position; The response transmission may be transmitted periodically, at a predetermined rate or at a rate dictated by the CAS airborne unit 103 that issued the transmission request;

d) after receiving steering commands 506 from the CAS airborne unit of the other aerial platform (with higher priority level), these commands are transmitted by CAS airborne unit 107 of the drone 109 to the CAS ground unit 109, allowing the remote pilot to perform the steering commands (the steering commands may be displayed on the display of the ground unit and/or played as audio commands via speaker or headphones). If the remote pilot fails to perform the steering commands using remote control 113 (e.g., after a predetermined time), the CAS airborne unit 107 overrides the remote pilot remote control commands and performs the received steering commands by applying the steering commands on the flight controls of own aerial platform 106.

Figure 6:
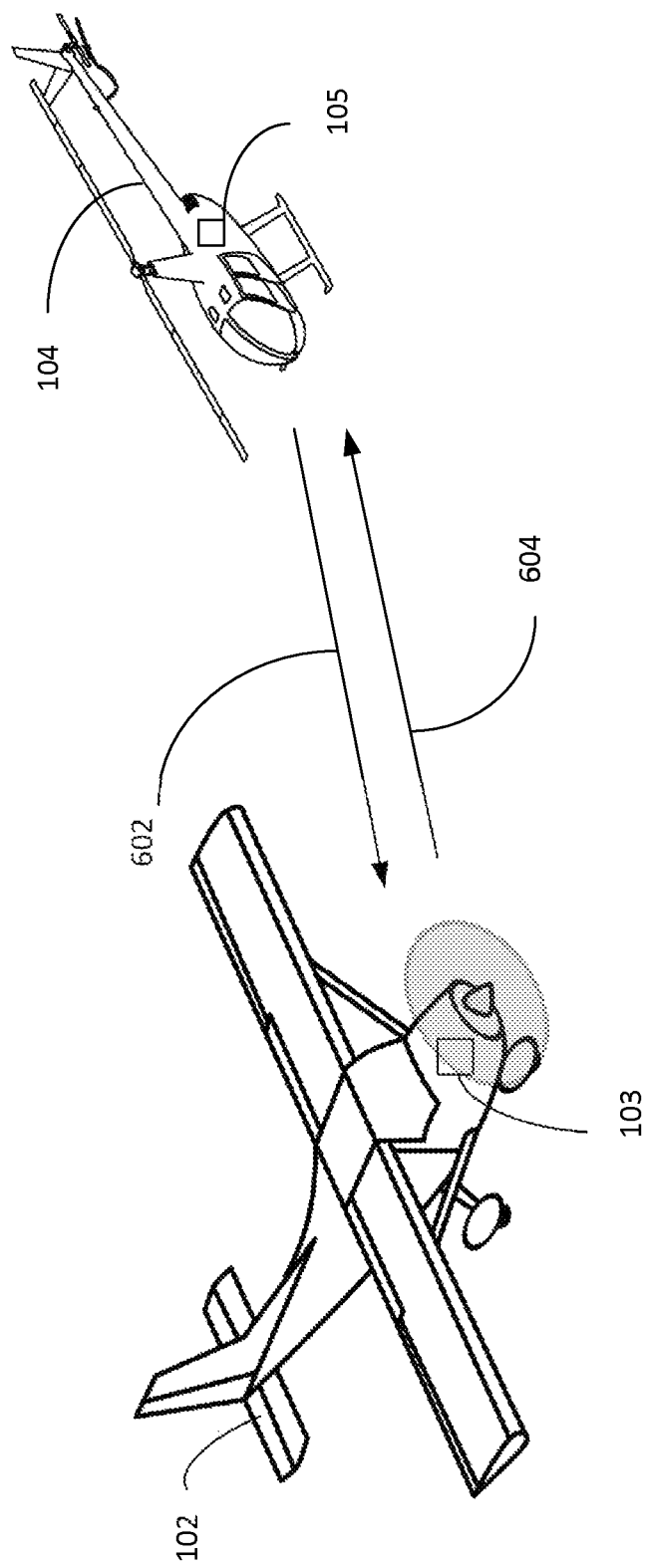
FIG. 6 illustrates operation of CAS airborne units on board two aerial platforms of same priority level, according to some embodiments of the invention.

FIG. 6 illustrates operation of CAS airborne units on board two aerial platforms of same priority level (level 1—two manned aerial platforms), according to some embodiments of the invention.

When two aerial platforms share the same priority level, each CAS airborne unit may calculate the collision risk and/or calculate possible traffic conflict based on the information they provide to each other via the response transmission (invoked by the request transmission) and may generate, each, one or a plurality of steering commands, e.g., by providing these commands to an on-board or remote pilot or via a controller operating the flight controls of the aerial platform so as to be get the steering commands performed by own aerial platform.

According to some embodiments of the present invention, the table below lists various actions that may be performed by a CAS airborne unit (classified as priority level 1 or level 2):

|  | Level 1 | Level 2 |
|---|---|---|
| Send transmission request | + | − |
| Transmit own ID & position | +/− | + |
| Display other platform to pilots onboard | + | − |
| Display other platform to remote pilots | +/− | + |
| generate & transmit steering commands to be executed by other platform | + | − |
| Generate steering commands for own platform | + | +/− |
| Provide steering commands to pilot onboard | +/− | − |
| Send steering commands to remote pilot | +/− | + |
| Injects steering commands to auto pilot | +/− | +/− |

"+" indicates performance of an action by the corresponding CAS airborne unit, "−" indicates non-performance and "+/−" indicates that some CAS airborne units perform that action while other CAS airborne units do not.

According to some embodiments of the invention, CAS airborne units may be configured to control the density of aerial traffic within a given airspace, for example, in order to control flight risks.

In order to control the risk, density of aerial platforms in a given airspace may be controlled and restricted, so as to make sure no more than a pre-set number of aerial platforms operate within a given airspace.

Density may be enforced in two levels, in the planning level and in real time.

For example, in the planning level, when allocating airspace to a plurality of aerial platforms, the planning authority may limit the number of aerial platforms allowed in given airspace, for example in compliance to regulatory limitations.

In real time, for example, a central control and command may maintain a real time information regarding all aerial activity and real time open line of communication with all vehicles.

According to some embodiments of the invention, a method for controlling air traffic and for avoiding mid-air collision is provided.

Various parameters of the airspace and air traffic may be predetermined by a regulatory authority. For example, the regulatory authority may determine the shape of the airspace (cylinder, cube), dimensions of a basic airspace volume (radius 710 and height 705 in case of a cylinder), maximum number of platforms allowed in the airspace volume defined, different parameters to different types and or priority level aerial platforms. For example: 3 helicopters or 6 unmanned drones or 2 manned and 2 drones, assign a priority level to each aerial platform.

In some embodiments of the present invention, a CAS airborne unit may be configured to communicate with other CAS airborne units in order to determine own aerial platform compliance with air traffic control rules, and if needed provide steering commands that may be needed to return to compliance with the air traffic control rules.

Figure 7:
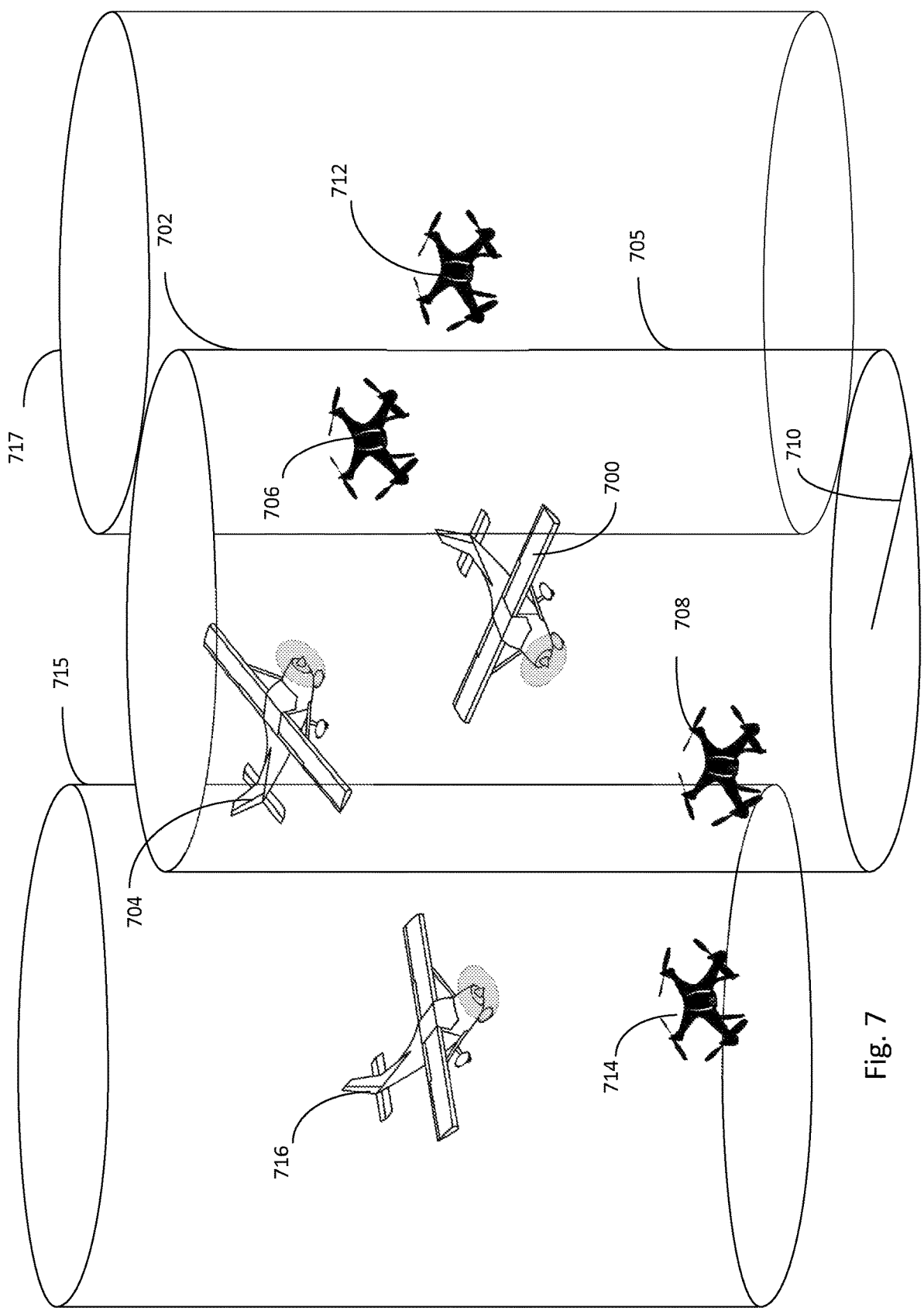
FIG. 7 schematically illustrates an airspace in which a plurality of aerial platforms of various priority levels concurrently exist, each including an on-board air-traffic control airborne unit, according to some embodiments of the present invention.

FIG. 7 schematically illustrates an airspace in which a plurality of aerial platforms of various priority levels concurrently exist, each including an on-board decentralized air traffic density control airborne unit, according to some embodiments of the present invention. The airspace may be filled with aerial platforms of various types and priority levels, e.g., three light planes 700, 704 and 716, and four drones 706, 708, 712 and 714, all equipped with an on-board decentralized air traffic density control (DDC) airborne unit (not shown for brevity). Each of the decentralized air traffic density control airborne units may be incorporated in a CAS airborne unit or provided separately (with or without a CAS airborne unit). Typically, the structure of DDC airborne units may be same, or similar to the structure of CAS units, for example as shown in FIGS. 2, 3A, 3B and 3C.

According to some embodiments of the present invention, each DDC airborne unit may be designed to periodically transmit a transmission request, receive such transmission request, periodically transmit a response to the transmission request which includes location information on the current location of own aerial platform, and in some embodiments also speed and heading of that aerial platform.

Each DDC airborne unit may be configured to monitor a defined personal airspace (e.g., personal airspace 702 of light plane 700, personal airspace 715 of light plane 716 and personal airspace 717 of drone 712 (the personal airspace of the other aerial platforms shown in this figure are not shown for brevity). The personal airspace may be defined as a cylinder or a sphere, or other geometrical shape, in which certain air traffic control rules (e.g. defined by law, regulations or other abiding rules). For example, an air traffic control rule may dictate that a personal space includes at any time no more than a predetermined number of aerial platforms, e.g., no more than four aerial platforms, or no more than two high priority level aerial platforms and no more than two low priority level aerial platforms, etc.

A DDC airborne unit may constantly or periodically monitor the number of aerial platforms, or the number and priority level of aerial platforms, in own personal airspace. A DDC airborne unit may constantly or periodically identify aerial platforms and/or their priority levels which are about to enter own personal airspace. In some embodiments of the invention, the DDC airborne unit may assume that each of the monitored aerial platforms maintains their last reported or calculated vector.

In some embodiments, if the number and/or priority levels of aerial platforms within own personal airspace are equal to or less than the allowed number, the DDC airborne unit may maintain monitoring of own personal airspace.

In some embodiments, if the number of aerial platforms inside own personal airspace exceeds the allowed number (of aerial platforms or of certain priority level aerial platforms) the DDC airborne unit may generate steering commands and communicate these commands to one or more aerial platforms which are classified with a lower priority level than own aerial platform, or calculate an own evading maneuver and perform this maneuver to reduce the number of aerial platforms in own personal airspace, if all aerial platforms in own personal airspace are of same or higher priority level.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples, the instructions stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A collision avoidance system (CAS) airborne unit for placing onboard an aerial platform classified as having a second priority level, the CAS airborne unit comprising:
   a communication module configured to receive intermittently transmitted localization transmissions and different steering commands from more than one CAS airborne unit on-board other aerial platforms that are classified as having a first priority level, wherein the second priority level is lower than the first priority level; and
   a processor configured to calculate, based on the received intermittently transmitted localization transmissions, on the different steering commands, and on a current location, speed and heading of the CAS airborne unit, a collision risk between the aerial platform and the other aerial platform, and to generate one or a plurality of steering commands for own aerial platform comprising a compromised solution,
   wherein the different steering commands comprise contradicting steering commands, and wherein the compromised solution comprises a freeze command to hold own aerial platform in position.

2. The CAS airborne unit of claim 1, wherein the compromised solution comprises steering commands for own aerial platform to take a flight course that is between different courses dictated by the more than one CAS airborne units.

3. The CAS airborne unit of claim 1, wherein the processor is further configured to communicate the compromised solution to the more than one CAS airborne units.

4. An air collision avoidance method comprising:
   using a communication module of an aerial platform classified as having a second priority level, receiving intermittently transmitted localization transmissions and different steering commands from more than one other CAS airborne unit on-board other aerial platforms that are classified as having a first priority level, wherein the second priority level is lower than the first priority level;
   using a processor, calculating, based on the received intermittently transmitted localization transmissions, on a current location, speed and heading of the CAS airborne unit_and on the different steering commands, a collision risk between the aerial platform classified as having the second priority level and the other aerial platforms, and generating, for own aerial platform classified as having the second priority level, one or a plurality of steering commands comprising a compromised solution,
   wherein the different steering commands comprise contradicting steering commands, and wherein the compromised solution comprises a freeze command to hold own aerial platform in position.

5. The method of claim 4, wherein the compromised solution comprises steering commands for own aerial platform to take a flight course thar is between different courses dictated by the more than one CAS airborne units.

6. The method of claim 4, further comprising communicating the compromised solution to the more than one CAS airborne units.

* * * * *